United States Patent
Choi et al.

(10) Patent No.: US 8,643,645 B2
(45) Date of Patent: Feb. 4, 2014

(54) METHOD AND APPARATUS FOR GENERATING ELEMENTAL IMAGE IN INTEGRAL IMAGING

(75) Inventors: Yoon-sun Choi, Incheon (KR); Moon-gyu Lee, Suwon-si (KR); Byoung-ho Lee, Seoul (KR); Joon-ku Han, Seoul (KR); Yun-hee Kim, Seoul (KR); Gil-bae Park, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 933 days.

(21) Appl. No.: 12/029,651

(22) Filed: Feb. 12, 2008

(65) Prior Publication Data

US 2008/0309669 A1     Dec. 18, 2008

(30) Foreign Application Priority Data

Jun. 18, 2007   (KR) .................. 10-2007-0059519

(51) Int. Cl.
G06T 15/10        (2011.01)
(52) U.S. Cl.
USPC ........................................... 345/427
(58) Field of Classification Search
USPC ............... 345/418–427; 348/42–60
See application file for complete search history.

(56) References Cited

U.S. PATENT DOCUMENTS 3,671,122 A * 6/1972 Dudley .................. 355/22

FOREIGN PATENT DOCUMENTS

| JP | 1996-011606 A | 1/1998 |
| JP | 2003-030676 A | 1/2003 |
| JP | 2006-268074 A | 10/2006 |
| KR | 1020020003629 A | 1/2002 |
| KR | 1020060096596 A | 9/2006 |

OTHER PUBLICATIONS

Foley et al., Computer Graphics: Principles and Practice, Addison-Wesley, 2nd Edition, pp. 268, 229, 278.*
Salvator, "ExtremeTech 3D Pipeline Tutorial", Jun. 13, 2001, ExtremeTech.com, http://www.extremetech.com/article2/0,1697,9722,00.asp.*
Shin et al., Three-Dimensional Integral Imaging for Orthoscopic Real Image Reconstruction, SPIE vol. 5636, pp. 379-385.*
Gilbae Park, Seong-Woo Cho, Joohwan Kim, Yunhee Kim, Heejin Choi, Joonku Hahn, Byoungho Lee, "Pickup Method from OpenGL by Reverse Projection Matrix for Real-Orthoscopic Integral Imaging", Jun. 18, 2007, Digital Holography and Three-Dimensional Imaging.*
Foley et al., Computer Graphics: Principles and Practice, Jul. 1997, Addison-Wesley, $2^{nd}$Edition, pp. 229, 268, and 278.*
Shin et al., "Three-Dimensional Integral Imaging for Orthoscopic Real Image Reconstruction", Feb. 28, 2005, Proc. SPIE 5636, Holography, Diffractive Optics, and Applications II, 379-385.*

* cited by examiner

Primary Examiner — Ulka Chauhan
Assistant Examiner — Robert Bader
(74) Attorney, Agent, or Firm — Sughrue Mion, PLLC

(57) ABSTRACT

A method and apparatus for generating an elemental image by an integral image technique are provided. The method includes normalizing coordinates of dots in a frustum formed in perspective projection by mapping the dots in the frustum into a cube; reversing a grade of depth of the cube viewed from a particular viewpoint; and generating a two-dimensional (2D) elemental image necessary for three-dimensional (3D) display from dots in the cube whose grade of depth is reversed.

11 Claims, 4 Drawing Sheets

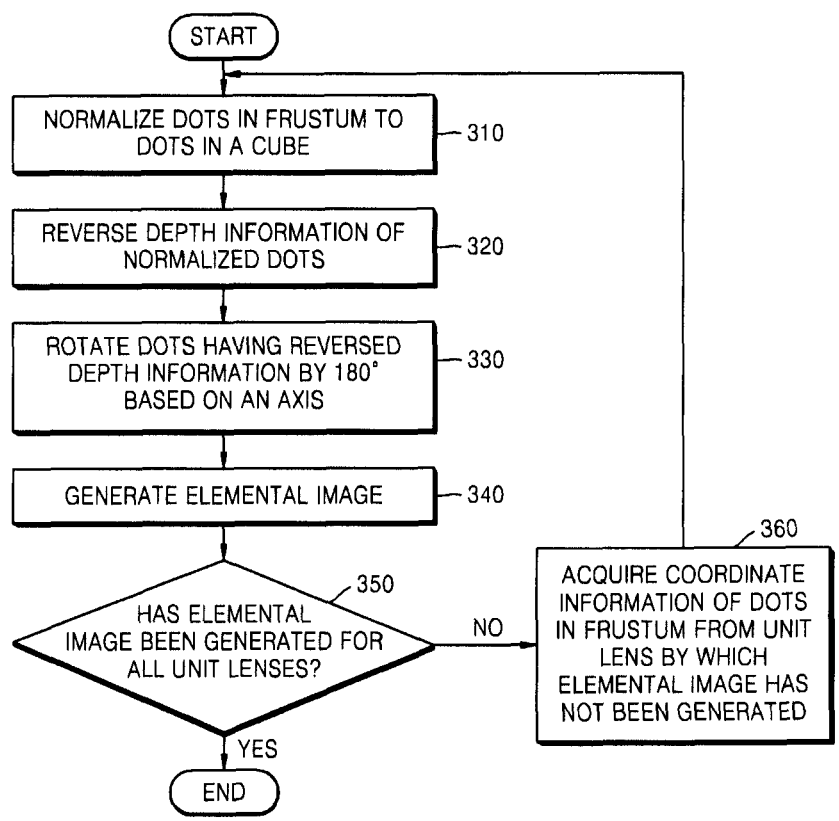
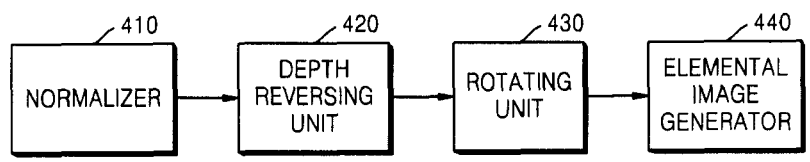

ROTATE DOTS BY
180° BASED ON
EACH OPTICAL AXIS

OPTICAL
AXIS

METHOD AND APPARATUS FOR GENERATING ELEMENTAL IMAGE IN INTEGRAL IMAGING

CROSS REFERENCE TO THE RELATED APPLICATIONS

This application claims priority from Korean Patent Application No. 10-2007-0059519, filed on Jun. 18, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to generating an elemental image, and more particularly, to generating an elemental image used to display a three-dimensional (3D) image in Integral Photography (IP) or Integral Imaging.

2. Description of the Related Art

FIG. 1 is a conceptual diagram of a three-dimensional (3D) image being displayed by using an elemental image in Integral photography (IP) according to the related art.

A related art apparatus for displaying a 3D image using an elemental image in IP includes an elemental image generator 110 and a display unit 120. The elemental image generator 110 includes a photographing device 111 and a lens array 112. The display unit 120 includes a display device 121 and a lens array 122.

The related art apparatus for displaying a 3D image using an elemental image in IP acquires elemental images of an apple 130 using the elemental image generator 110 and displays the elemental images in the display unit 120 in order for a user 150 to view a 3D object 140. An elemental image is a two-dimensional (2D) fundamental image which is located in the back of the lens array 122 as illustrated in FIG. 1 and allows a user to view a 3D object. The elemental image may be generated by using an actual camera and an actual lens array or by using computer graphics.

The elemental image generator 110 generates and stores elemental images that are 2D images obtained by viewing the apple 130 from various directions. The lens array 112 forms the elemental images of the apple 130 using unit lenses composing the lens array 112. The lens array 112 is achieved by two-dimensionally arranging a plurality of unit lenses. The photographing device 111 stores elemental images of an object, which are formed by the lens array 112.

The display unit 120 performs an inverse process of the process performed by the elemental image generator 110. That is, the display unit 120 displays the elemental images generated by the elemental image generator 110 and reproduces a 3D image 140 using the displayed elemental images. The display device 121 displays the elemental images stored in the photographing device 111. The lens array 122 generates the 3D image 140 by integrating the elemental images displayed by the display device 121. The lens array 122 is achieved by two-dimensionally arranging a plurality of unit lenses.

The related art apparatus for displaying a 3D image using an elemental image in IP generates an elemental image by capturing an actual object using a camera or in a Computer-Generated Integral Photography (CGIP) method and displays the generated elemental image on a film or monitor. However, since an object generated by the elemental image generator 110 is shown in an opposite direction of an object displayed by the display unit 120, when the object is displayed, a pseudoscopic effect occurs. The pseudoscopic effect means that since capturing and reproduction are achieved in an opposite direction to each other, the depth of a reproduced 3D image is shown in reverse. Since depth information of an image captured by a camera is reversed compared to that of a three-dimensionally displayed image due to the pseudoscopic effect, when a user views the displayed image, a convex object is viewed as if concave, a concave object is viewed as if convex, and a closer object is viewed as if smaller than a farther object. A convex portion of the right part of the apple 130, which is closer to the lens array 112 and captured through a side part of the lens array 112, is farther from the lens array 112. When images captured through the lens array 112 of the elemental image generator 110 are displayed through the lens array 122 of the display unit 120, since an apple 140 as a displayed 3D image has only a partial image of a convex part of the right of the apple 130, the apple 140 looks concave on one side thereof from a viewpoint of a person viewing from the other side of the lens array 122. This phenomenon is a kind of pseudoscopic effect and is an inevitable phenomenon occurring due to a basic optical principle when a real image of an actual object in front of a lens array is formed on a film.

FIG. 2 is a conceptual diagram for explaining perspective projection according to the related art.

In 3D computer graphics, perspective projection is used to two-dimensionally represent 3D data. The perspective projection is a method of displaying a frustum 205 on a projection plane 202 at a larger size, as the frustum 205 viewed from a viewpoint 201 is closer to the viewpoint 201. Thus, the size of an object closer to the viewpoint 201 and the size of an object farther from the viewpoint 201 are differently displayed on the projection plane 202. In this case, a volume of an object to which the perspective projection is applied is called the frustum 205, the closest plane from the viewpoint 201 to the frustum 205 is defined as a front-end plane 203, and the farthest plane is defined as a rear-end plane 204.

However, when a 3D image is displayed as a real image by using an elemental image obtained by the perspective projection, the pseudoscopic effect occurs, and even if the pseudoscopic effect is solved, it requires a large amount of time.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a method and apparatus for generating an elemental image, whereby a pseudoscopic effect, occurring when a three-dimensional (3D) image is displayed by an integral image technique, is solved and an elemental image necessary to display a 3D image can be generated at high speed.

According to an aspect of the present invention, there is provided a method of generating an elemental image, the method comprising: normalizing coordinates of dots in a frustum formed in perspective projection by mapping the dots in the frustum into a cube; reversing a grade of depth of the cube viewed from a particular viewpoint; and generating a two-dimensional (2D) elemental image necessary for three-dimensional (3D) display from dots in the cube whose grade of depth is reversed.

According to another aspect of the present invention, there is provided an apparatus for generating an elemental image, the apparatus comprising: a normalizer which normalizes coordinates of dots in a frustum formed in perspective projection by mapping the dots in the frustum into a cube; a depth reversing unit which receives the dots mapped into the cube and reverses a grade of depth of the cube viewed from a particular viewpoint; and an elemental image generator which generates a 2D elemental image necessary for 3D display from dots whose grade of depth is reversed by the depth reversing unit.

BRIEF DESCRIPTION OF THE DRAWINGS

The above and other aspects of the present invention will become more apparent by describing in detail exemplary embodiments thereof with reference to the attached drawings in which:

FIG. 3 is a flowchart of a method of generating an elemental image according to an exemplary embodiment of the present invention;

FIG. 4 is a block diagram of an apparatus for generating an elemental image according to an exemplary embodiment of the present invention;

DETAILED DESCRIPTION OF THE INVENTION

The present invention will be described in detail by explaining exemplary embodiments of the invention with reference to the attached drawings.

FIG. 3 is a flowchart of a method of generating an elemental image according to an exemplary embodiment of the present invention.

Figure 1:
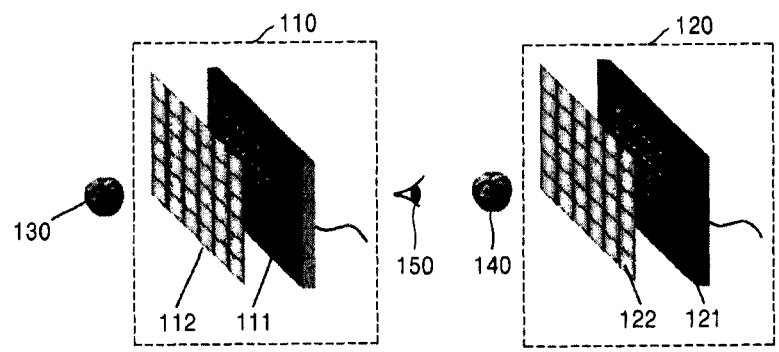
FIG. 1 is a conceptual diagram of a three dimensional (3D) image being displayed by using an elemental image in integral photography (IP) according to the related art.
Figure 2:
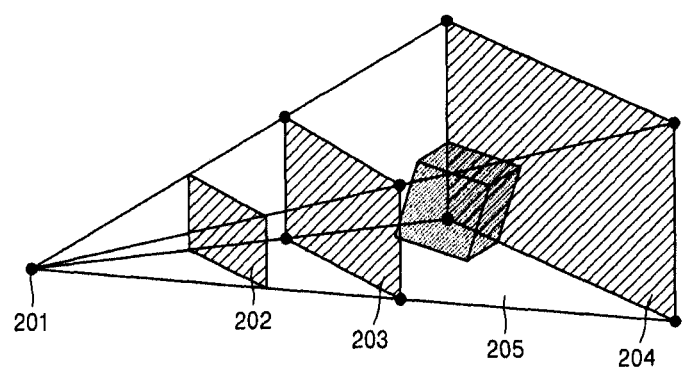
FIG. 2 is a conceptual diagram for explaining perspective projection according to the related art.
Figure 5:
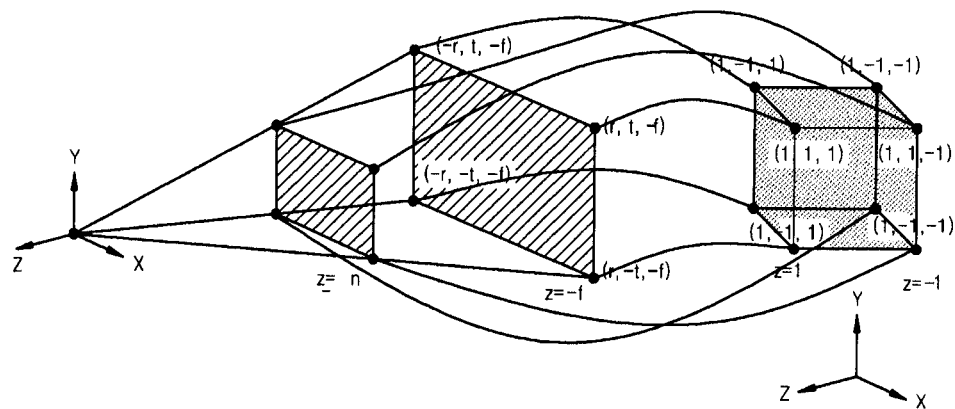
FIG. 5 is a conceptual diagram of operations of normalizing coordinates of dots in a frustum and reversing a grade of depth of the normalized dots, of the method illustrated in FIG. 3, according to an exemplary embodiment of the present invention.

In operation 310, an apparatus for performing the method of generating an elemental image normalizes coordinates of dots in a frustum illustrated in FIG. 5 by mapping coordinate information of the dots in the frustum to coordinate information of dots in a cube.

The normalization is performed using Equation 1.

$$\begin{pmatrix} x' \\ y' \\ z' \\ w' \end{pmatrix} = \begin{pmatrix} \frac{f}{r} & 0 & 0 & 0 \\ 0 & \frac{f}{r} & 0 & 0 \\ 0 & 0 & 1 & 0 \\ 0 & 0 & 0 & 1 \end{pmatrix} \begin{pmatrix} x \\ y \\ z \\ w \end{pmatrix} \begin{array}{l} x' = \frac{f}{r}x \\ y' = \frac{f}{r}y \\ z' = z \end{array} \quad \text{(Equation 1)}$$

Here, referring to FIG. 5, −f denotes z-axis boundary coordinates of a rear-end plane of a frustum, r denotes x-axis boundary coordinates in the right of the rear-end plane of the frustum, and t denotes y-axis boundary coordinates in the top of the rear-end plane of the frustum.

In operation 320, the apparatus for performing the method of generating an elemental image reverses a grade of depth of the dots normalized into the cube in operation 310. A method of reversing the grade of depth reverses a grade of depth of the cube viewed from a particular viewpoint. As a result of reversing the grade of depth, a grade of depth of a dot close to the viewpoint is exchanged with a grade of depth of a dot far from the viewpoint, and thus, dots close to the viewpoint look far, and dots far from the viewpoint look close. Depth information can be reversed using Equation 2. The grade of depth can be represented using z-axis coordinates by referring to FIG. 5.

$$\begin{pmatrix} x' \\ y' \\ z' \\ w' \end{pmatrix} = \begin{pmatrix} 1 & 0 & 0 & 0 \\ 0 & 1 & 0 & 0 \\ 0 & 0 & \frac{f+n}{f-n} & \frac{2fn}{f-n} \\ 0 & 0 & -1 & 0 \end{pmatrix} \begin{pmatrix} x \\ y \\ z \\ w \end{pmatrix} \quad \text{(Equation 2)}$$

$$x' = \frac{x}{-z}$$

$$y' = \frac{y}{-z}$$

$$z' = \frac{\left( y\left(\frac{f+n}{f-n}\right) + x\left(\frac{2fn}{f-n}\right) \right)}{-z}$$

Here, referring to FIG. 5, −f denotes z-axis boundary coordinates of a rear-end plane of a frustum, and −n denotes z-axis boundary coordinates of a front-end plane of the frustum. Thus, after the coordinate information of the dots in the frustum is normalized, a matrix for reversing a grade of depth of the normalized dots can be obtained using Equation 3.

$$T'_r = T \cdot S = \begin{pmatrix} 1 & 0 & 0 & 0 \\ 0 & 1 & 0 & 0 \\ 0 & 0 & \frac{f+n}{f-n} & \frac{2fn}{f-n} \\ 0 & 0 & -1 & 0 \end{pmatrix} \begin{pmatrix} \frac{f}{r} & 0 & 0 & 0 \\ 0 & \frac{f}{r} & 0 & 0 \\ 0 & 0 & 1 & 0 \\ 0 & 0 & 0 & 1 \end{pmatrix} = \quad \text{(Equation 3)}$$

$$\begin{pmatrix} \frac{f}{r} & 0 & 0 & 0 \\ 0 & \frac{f}{r} & 0 & 0 \\ 0 & 0 & \frac{f+n}{f-n} & \frac{2fn}{f-n} \\ 0 & 0 & -1 & 0 \end{pmatrix}$$

Here, T denotes a matrix for reversing a grade of depth, and S denotes a matrix for normalizing coordinate information of dots in a frustum. Thus, $T_r$ becomes a matrix for normalizing coordinate information of dots in a frustum and reversing a grade of depth of the normalized coordinate information. If coordinates of a dot P in a frustum are (x, y, z), the dot P is transformed to a dot P' (x', y', z') whose grade of depth is reversed by Equation 4.

$$\begin{pmatrix} x' \\ y' \\ z' \\ w' \end{pmatrix} = \begin{pmatrix} \frac{f}{r} & 0 & 0 & 0 \\ 0 & \frac{f}{r} & 0 & 0 \\ 0 & 0 & \frac{f+n}{f-n} & \frac{2fn}{f-n} \\ 0 & 0 & -1 & 0 \end{pmatrix} \begin{pmatrix} x \\ y \\ z \\ w \end{pmatrix} \quad \text{(Equation 4)}$$

Here, referring to FIG. 5, −f denotes z-axis boundary coordinates of a rear-end plane of a frustum, −n denotes z-axis boundary coordinates of a front-end plane of the frustum, r denotes x-axis boundary coordinates in the right of the rear-end plane of the frustum, t denotes y-axis boundary coordinates in the top of the rear-end plane of the frustum, and w denotes a value for normalizing x, y, and z coordinates, and w' denotes a value for normalizing x', y', and z' coordinates.

In operation 330, the apparatus for performing the method of generating an elemental image rotates the dots in the cube whose grade of depth was reversed in operation 320 by 180° on an axis of the center of an image acquired from a unit lens constituting a lens array, by using Equation 5. If the dot P' (x', y', z') transformed in operation 320 is transformed by using Equation 5, a dot P'' (x'', y'', z'') rotated by 180° on the axis is obtained. The axis matches an optical axis of the unit lens.

$$x'' = -x', \; y'' = -y', \; z'' = z' \quad \text{(Equation 5)}$$

$$\begin{pmatrix} x'' \\ y'' \\ z'' \\ w'' \end{pmatrix} = \begin{pmatrix} -1 & 0 & 0 & 0 \\ 0 & -1 & 0 & 0 \\ 0 & 0 & 1 & 0 \\ 0 & 0 & 0 & 1 \end{pmatrix} \begin{pmatrix} x' \\ y' \\ z' \\ w' \end{pmatrix}$$

$$= \begin{pmatrix} -1 & 0 & 0 & 0 \\ 0 & -1 & 0 & 0 \\ 0 & 0 & 1 & 0 \\ 0 & 0 & 0 & 1 \end{pmatrix} \begin{pmatrix} \frac{f}{r} & 0 & 0 & 0 \\ 0 & \frac{f}{r} & 0 & 0 \\ 0 & 0 & \frac{f+n}{f-n} & \frac{2fn}{f-n} \\ 0 & 0 & -1 & 0 \end{pmatrix} \begin{pmatrix} x \\ y \\ z \\ w \end{pmatrix}$$

$$= \begin{pmatrix} -\frac{f}{r} & 0 & 0 & 0 \\ 0 & -\frac{f}{r} & 0 & 0 \\ 0 & 0 & \frac{f+n}{f-n} & \frac{2fn}{f-n} \\ 0 & 0 & -1 & 0 \end{pmatrix} \begin{pmatrix} x \\ y \\ z \\ w \end{pmatrix}$$

In operation 340, the apparatus for performing the method of generating an elemental image generates a two-dimensional (2D) elemental image necessary for three-dimensional (3D) display from the dots rotated by 180° in operation 330. In operation 340, viewport transformation for transforming the generated elemental image to a desired size of a screen can be further performed. The generated single elemental image corresponds to a portion among elemental images corresponding to unit lenses constituting a lens array.

In operation 350, the apparatus for performing the method of generating an elemental image determines whether elemental images for 3D display in terms of all unit lenses constituting the lens array have been generated. As a result of the determination, if a unit lens of which a corresponding elemental image has not been generated exists, the process proceeds to operation 360, or if a unit lens of which a corresponding elemental image has not been generated does not exist, the process ends.

In operation 360, the apparatus for performing the method of generating an elemental image acquires coordinate information of dots in a frustum from the unit lens of which a corresponding elemental image has not been generated.

Meanwhile, when a 3D image is displayed, a different method of generating an elemental image must be used according to whether a real image or a virtual image is displayed. When an elemental image used to display a real image is generated using related art perspective projection, a 3D image whose depth is reversed is displayed, and thus, when the real image is displayed, the method of generating an elemental image according to an exemplary embodiment of the present invention may be used. A real image is an image displayed in front of a display unit when a 3D object is displayed.

FIG. 4 is a block diagram of an apparatus for generating an elemental image according to an exemplary embodiment of the present invention.

Referring to FIG. 4, the apparatus for generating an elemental image according to the current exemplary embodiment includes a normalizer 410, a depth reversing unit 420, a rotating unit 430, and an elemental image generator 440.

The normalizer 410 normalizes coordinates of dots in a frustum formed in perspective projection by mapping the dots in the frustum into a cube and outputs coordinate information of dots in the cube to the depth reversing unit 420.

The depth reversing unit 420 receives the coordinate information of dots in the cube and reverses a grade of depth of the cube as viewed from a particular viewpoint. In order to reverse the depth, by transforming a grade of depth located in the front of the cube to depth information of a dot located in the back of the cube, the grade of depth of the dots in the cube can be reversed. As a result of reversing the grade of depth, a grade of depth of a dot close to the viewpoint is exchanged with a grade of depth of a dot far from the viewpoint, and thus, dots close to the viewpoint appear far, and dots far from the viewpoint appear close.

The rotating unit 430 receives from the depth reversing unit 420 coordinate information of dots in the cube whose grade of depth has been reversed and rotates the received coordinate information by 180° on an axis of the center of an image acquired from a unit lens constituting a lens array used in perspective projection. The axis matches an optical axis of the unit lens.

The elemental image generator 440 receives coordinate information of dots in the cube rotated by 180° from the rotating unit 430 and generates a 2D elemental image from the received coordinate information. The elemental image generator 440 may also perform viewport transformation for transforming the generated elemental image into image displayed on a specified size of a screen. A single elemental image generated by performing the viewport transformation may constitute a portion of elemental images corresponding to unit lenses forming the lens array.

FIG. 5 is a conceptual diagram of operations 310 and 320 of the method illustrated in FIG. 3, according to an exemplary embodiment of the present invention.

The transformation illustrated in FIG. 5 can be performed by using Equation 4. Referring to Equation 4, the matrix $T_r$ moves a dot P having 3D coordinates (x, y, z) to a dot P' (x', y', z'). In this case, the calculation is performed by $$x' = -\frac{fx}{rz}, \quad y' = -\frac{fy}{tz}, \quad z' = -\frac{f+n}{f-n} - \frac{2fn}{z(f-n)}.$$

Referring to FIG. 5, the matrix $T_r$ transforms each apex of a frustum to each apex of a cube of which the length of one side is 2 and an origin is the center. The difference compared to the related art perspective projection is that depth is reversed by transforming dots close to a viewpoint to dots far from the viewpoint. Position information of an object normalized as in a cube in the right side of the drawing illustrated in FIG. 5 can be obtained by generating a 2D elemental image in a specific display area in a direction looking from a plane of which z=1 to a plane of which z=−1.

Figure 6A:
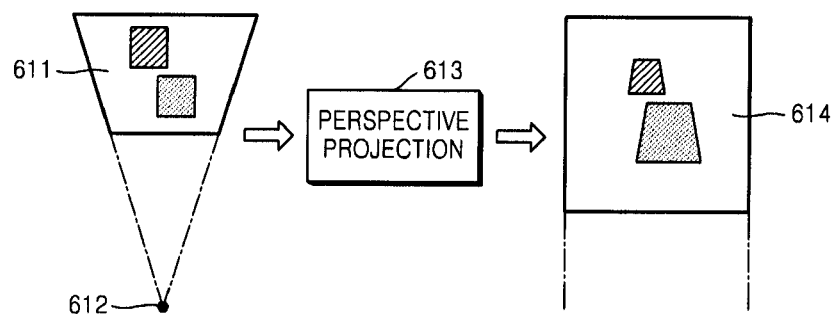
FIGS. 6A and 6B illustrate a comparison of related art perspective projection to the method of generating an elemental image according to an exemplary embodiment of the present invention.
Figure 6B:
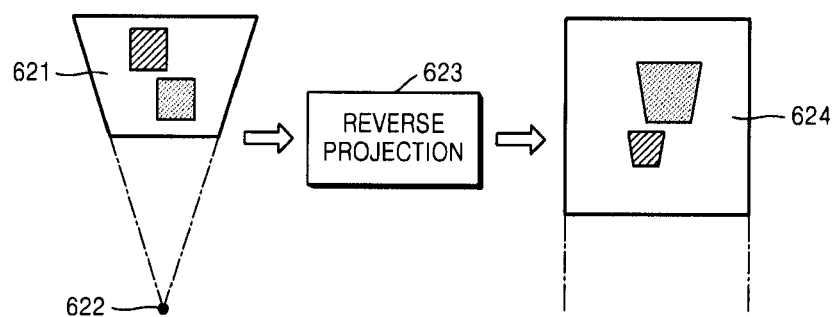

FIGS. 6A and 6B illustrate a comparison of related art perspective projection to the method of generating an elemental image according to an exemplary embodiment of the present invention. The method of generating an elemental image according to an exemplary embodiment of the present invention is called reverse projection. Reverse projection is a method of normalizing coordinate information of dots in a frustum and reversing a grade of depth of the dots. Unlike the perspective projection, in reverse projection, as a frustum viewed from a viewpoint is closer to the viewpoint, the frustum appears smaller on a projection plane. Referring to FIG. 3, operations 310 and 320 correspond to the reverse projection.

FIG. 6A illustrates the related art perspective projection. If the perspective projection 613 is used, a frustum 611 viewed from a viewpoint 612 appears larger as it is closer to the viewpoint 612 as shown from a viewpoint 614 to which the perspective projection 613 is applied.

FIG. 6B illustrates reverse projection that is the method of generating an elemental image according to an exemplary embodiment of the present invention. If the reverse projection 623 is used, a frustum 621 viewed from a viewpoint 622 appears smaller as it is closer to the viewpoint 622 as shown from a viewpoint 624 to which the perspective projection 623 is applied. By using the reverse projection 623, the frustum 621 before the perspective projection 623 is applied is displayed by oppositely applying depth information of the front and the back to the frustum 621. That is, an elemental image is displayed in such a manner that dots close to the viewpoint 622 look far and dots far from the viewpoint 622 look close. However, when the elemental image whose depth information has been reversed is three-dimensionally displayed through an actual lens array, the pseudoscopic effect disappears.

Figures 7A, 7B:
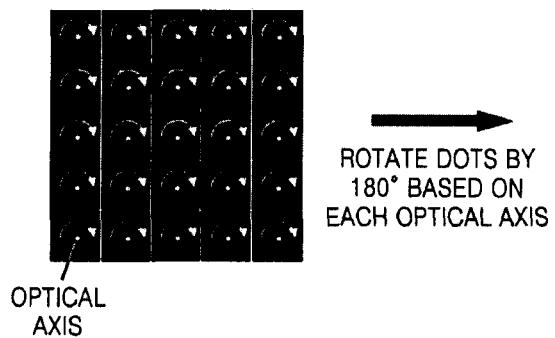
FIGS. 7A and 7B illustrate coordinate information of dots, which are normalized and of which a grade of depth information is reversed, rotated by 180° based on an optical axis of each of a plurality of unit lenses, according to an exemplary embodiment of the present invention.

FIGS. 7A and 7B illustrate coordinate information of dots, which are normalized and of which a grade of depth information is reversed, rotated by 180° based on an optical axis of each of a plurality of unit lenses, according to an exemplary embodiment of the present invention. Referring to FIG. 3, FIG. 7A illustrates elemental images after operation 320 is performed, and FIG. 7B illustrates elemental images after operation 330 is performed. The elemental images are acquired from a lens array constituted of a plurality of unit lenses, and an optical axis of each unit lens matches a center axis of an elemental image acquired from the unit lens.

The method and apparatus for generating an elemental image according to an exemplary embodiment of the present invention can be used when an elemental image is generated using a Personal Computer (PC), and by simply performing the method of generating an elemental image according to an exemplary embodiment of the present invention using matrix calculation, the pseudoscopic effect can be prevented, and an elemental image of a real image can be simultaneously generated at high speed. In addition, since the method of generating an elemental image according to an exemplary embodiment of the present invention is used when an elemental image necessary to display 3D object information as a 3D image is generated, the method can be used as part of a transforming process for displaying existing content as a 3D image. The method of generating an elemental image according to an exemplary embodiment of the present invention can be used by being implemented in a single software module in terms of general application software, a logic module of a Field Programmable Gate Array (FPGA) in terms of hardware, or a hardware signal processing module in a Graphic Processing Unit (GPU). In addition, the method and apparatus for generating an elemental image according to an exemplary embodiment of the present invention can be applied to an integral image technique and other 3D display systems.

As described above, according to the present invention, by reversing the depth of an elemental image used when a 3D image is displayed using an integral image technique, a 3D image viewed by a user when the 3D image is displayed can look like an actual object without a pseudoscopic effect. In addition, by performing normalization of a frustum and reversing the depth of the normalized frustum through matrix calculation, an elemental image for 3D display without the pseudoscopic effect can be generated at high speed.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of generating an elemental image, the method comprising:
normalizing coordinates of dots in a frustum formed in perspective projection by mapping the dots in the frustum into dots in a cube;
reversing a grade of depth of each of the dots in the cube viewed from a viewpoint using z-axis coordinates of a front-end plane and a rear-end plane of the frustum to exchange a grade of depth of a dot in the cube close to the viewpoint with a grade of depth a dot in the cube far from the viewpoint; and
generating one of a plurality of two-dimensional (2D) elemental images necessary for three-dimensional (3D) display from the reversed grades of depth of the dots in the cube using one of a plurality of lenses,
wherein each of the dots in the frustum and each of the dots in the cube include x-axis coordinates, y-axis coordinates, and z-axis coordinates, and the grade of depth is represented using the z-axis coordinates, and
wherein the reversing the grade of depth of each of the dots in the cube comprises exchanging coordinates of a dot located in a front plane of the cube with coordinates of a dot located in a rear plane of the cube.

2. The method of claim 1, wherein the 2D elemental image is an element of a real image.

3. The method of claim 2, wherein the reversing a grade of depth of the cube further comprises rotating the dots whose grades of depth are reversed, by 180° based on an optical axis of a lens used in perspective projection, and the generating a 2D elemental image comprises generating a 2D elemental image necessary for 3D display from the dots rotated by 180°.

4. The method of claim 3, wherein the optical axis of a lens used in perspective projection matches the center of an image acquired from the lens.

5. The method of claim 1, further comprising:
determining whether a lens by which an elemental image has not been generated exists among all lenses used in the perspective projection; and
if it is determined that a lens by which an elemental image has not been generated exists, acquiring coordinates of dots in the frustum for which an elemental image has not been generated, and returning to the normalizing coordinates of dots in a frustum formed in perspective projection.

6. The method of claim 1, further comprising performing viewport transformation for transforming the generated elemental image into an image displayed on a specified size of a screen.

7. An apparatus for generating an elemental image, the apparatus comprising:
a normalizer which normalizes coordinates of dots in a frustum formed in perspective projection by mapping the dots in the frustum into dots in a cube;
a depth reversing unit which receives the dots in the cube and reverses a grade of depth of each of the dots in the cube viewed from a viewpoint using z-axis coordinates of a front-end plane and a rear-end plane of the frustum to exchange a grade of depth of a dot in the cube close to the viewpoint with a grade of depth a dot in the cube far from the viewpoint; and
an elemental image generator which generates one of a plurality of 2D elemental images necessary for 3D display from the reversed grades of depth of the dots in the cube,
wherein each of the dots in the frustum and each of the dots in the cube include x-axis coordinates, y-axis coordinates, and z-axis coordinates, and the grade of depth is represented using the z-axis coordinates, and
wherein the depth reversing unit exchanges coordinates of a dot located in a front plane of the cube with coordinates of a dot located in a rear plane of the cube.

8. The apparatus of claim 7, wherein the 2D elemental image is an element of a real image.

9. The apparatus of claim 7, further comprising a rotating unit which rotates the dots whose grades of depth are reversed by the depth reversing unit, by 180° based on an optical axis of a lens used in perspective projection, and
wherein the elemental image generator generates a 2D elemental image necessary for 3D display from the dots rotated by 180° by the rotating unit.

10. The apparatus of claim 9, wherein the optical axis of a lens used in perspective projection matches the center of an image acquired from the lens.

11. The apparatus of claim 7, wherein the elemental image generator performs viewport transformation for transforming the generated elemental image into an image displayed on a specified size of a screen.

* * * * *